United States Patent

[11] 3,585,578

| [72] | Inventor | Raymond C. Fischer, Jr. |
| | | Severna Park, Md. |
| [21] | Appl. No. | 818,006 |
| [22] | Filed | Apr. 21, 1969 |
| [45] | Patented | June 15, 1971 |
| [73] | Assignee | Westinghouse Electric Corporation |
| | | Pittsburgh, Pa. |

[54] SIDE LOOKING SONAR APPARATUS
6 Claims, 26 Drawing Figs.

[52] U.S. Cl. ..................................................... 340/3,
340/8, 340/9
[51] Int. Cl. ........................................................ G01s 9/66
[50] Field of Search ........................................... 340/3, 3 R,
8, 9, 10, 11

[56] References Cited
UNITED STATES PATENTS
3,067,281 12/1962 Pierre et al. .................... 340/5-I

| 3,296,579 | 1/1967 | Farr et al. ...................... | 340/3 |
| 3,359,537 | 12/1967 | Geil et al. ...................... | 340/8 |
| 3,381,264 | 4/1968 | Lavergne et al. ............. | 340/3 |

FOREIGN PATENTS

| 778,673 | 7/1957 | Great Britain ................ | 340/3 |

*Primary Examiner*—Richard A. Farley
*Attorneys*—F. H. Henson, D. Schron and E. P. Klipfel ABSTRACT: Side looking sonar transmitter transducer and receiver transducer positioned relative to one another so that maximum intensity of acoustic energy reflected from a target area is detected during the course of travel of the side looking sonar apparatus.

The transmitter and receiver transducers include elongated transducer active elements each comprised of a series of smaller active elements positioned end to end, each smaller element being positioned within a mounting block providing depression angle orientation.

SIDE LOOKING SONAR APPARATUS

BACKGROUND OF THE INVENTION

1. Field of the invention

The invention in general relates to sonar systems, and particularly to side looking sonar apparatus and constructional details thereof.

2. Description of the Prior Art

In side looking sonar apparatus a transducer transmitter carried by a propelled or towed vehicle periodically projects pulses of acoustic energy toward a target area such as the sea bottom. The operational and constructional characteristics of the apparatus are such that the transmitted energy has a beam pattern which is of very narrow beam width, for example less than 1° in the direction of vehicle travel and a relatively wide beam width, for example 90° measured in the vertical direction. The beam is sometimes referred to as "pancake"s haped The projected acoustic energy therefore impinges upon the sea bottom in a relatively narrow elongated area laterally of the direction of vehicle travel. This area upon which the sound impinges is known as the insonified area.

Acoustic energy reflected back from the insonified area is received by a transducer receiver carried by the vehicle. The receiver beam associated with the receiver is similar to the pancake-shaped beam previously described and accordingly the receiver detects reflected acoustic energy from a relatively narrow strip on the sea bottom and referred to herein as a receiver strip.

With very low vehicle speeds reflected acoustic energy from the insonified area may be properly detected and displayed on suitable display apparatus such as electrosensitive moving recording paper, or a cathode ray storage tube. With each pulse transmission and subsequent reception a scan line is produced on the display apparatus to build up a picture of the sea bottom in a manner similar to the scanning of a conventional cathode ray beam in a television picture tube.

For increased vehicle speeds however the reflected acoustic energy from the insonified area is returned at a point in time when the vehicle has moved a sufficient distance along its course of travel that the receiver beam is not responsive to the reflected acoustic energy to the degree desired for proper signal processing and display, due to increased phase shifting along the transducer face.

One solution to this problem has been to skew the transmitter with respect to the receiver. That is, the transmitter, or receiver, or both are rotated about a vertical axis so that the insonified area is at a slight angle with respect to the receiver strip on the sea bottom. This transducer orientation aids, but does not completely solve the problem for relatively high vehicle speed operations.

The primary object of the present invention therefore is to provide side looking sonar apparatus for high vehicle speed operation.

A further object is to provide such apparatus which may be constructed with a relative facility.

SUMMARY OF THE INVENTION

Side looking sonar apparatus, carried by a propelled or towed vehicle, is provided and includes at least a first elongated transducer serving as s transmitter and a second elongated transducer serving as a receiver. Pulses of acoustic energy are transmitted toward a target area such as the sea bottom whereupon for each acoustic transmission an elongated and very narrow area is insonified. The receiver beam pattern is such that the receiver receives acoustic energy reflected from a similar elongated narrow strip on the sea bottom.

The transducers are not only skewed with respect to one another but also tilted with respect to one another such that the insonified area is not only angularly disposed with respect to the receiver strip but is additionally projected ahead of the receiver strip in the direction of vehicle movement.

For increased speeds a plurality of transmitters are utilized, at different frequencies, for simultaneously insonifying adjacent areas on the sea bottom, the reflected acoustic energy from which may be detected by a respective pair of receivers.

Each of the transducers is made up of a plurality of relatively short active elements each contained in a block of material. The blocks are mounted end to end in a housing with the resulting elongated transducer being given a proper required depression angle in accordance with the block construction.

DESCRIPTION OF THE PREFERRED EMBODIMENT

Figure 1:
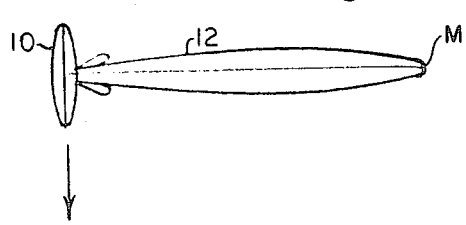
FIG. 1 illustrates a top view of a typical side looking sonar beam pattern.

FIG. 1 is a plan view of a self-propelled, or towed vehicle 10 carrying side looking sonar apparatus and proceeded over a target area along a course line as indicated by the arrow.

The side looking sonar beam pattern 12 is relatively narrow in the direction of course travel and is typically less then 1° measured 3db down from the point of maximum intensity, designated M.

Figure 2:
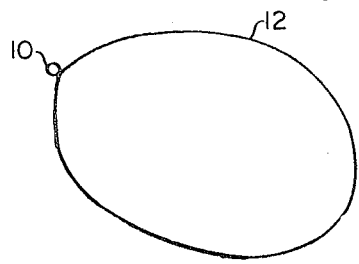
FIG. 2 illustrates an elevational view of the pattern of FIG. 1.

FIG. 2 illustrates the vehicle 10 proceeding toward the viewer and further illustrates the broad nature of the beam pattern 12 as depicted in a plane perpendicular to the target area, typically the sea bottom.

Figure 3A:
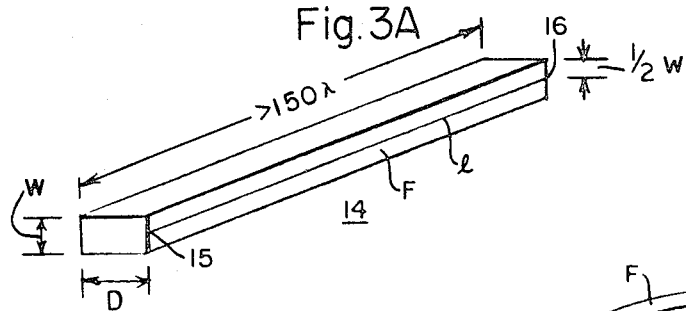
FIG. 3A is a view of a straight line transducer active element array.

The transducer means which provide the beam pattern 12 includes an elongated transducer active element such as that shown in FIGS. 3A. The active element for side looking sonar applications has a length L which is many times the wavelength ($\lambda$) of the operating frequency in sea water, a typical value of L being greater than 150$\lambda$. A typical dimension for the width W would be ¾$\lambda$, and a typical dimension for the depth D would be ½$\lambda'$ when $\lambda'$ is the wavelength in the transducer material. 1 is an imaginary straight line on the active face F and extends longitudinally between a pair of spaced points 15 and 16 each located at a distance ½ W from the top edge of the active face F.

FIG. 3A illustrates an active element disposed in a straight line. Typically the active element, due to its great length is made up of a plurality of smaller elements disposed end to end. Some types of side looking sonar apparatus incorporate a curved transducer array such as illustrated in FIG. 3B.

Figure 3B:
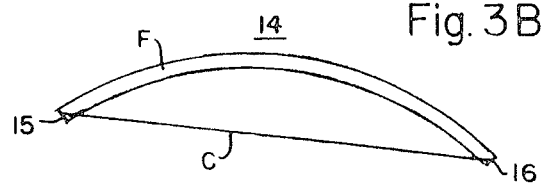
FIG. 3B is a view of a curved line transducer active element array.

The curved array of FIG. 3B includes an active radiating face F arcuately arranged and the straight line C joining spaced-apart points 15 and 16 forms a cord of the transducer arc.

Upon the application of a suitable electrical signal, acoustic energy is radiated from the active face F of the active element, and conversely when certain acoustic energy impinges upon the active element a corresponding output signal will be provided.

Figure 4:
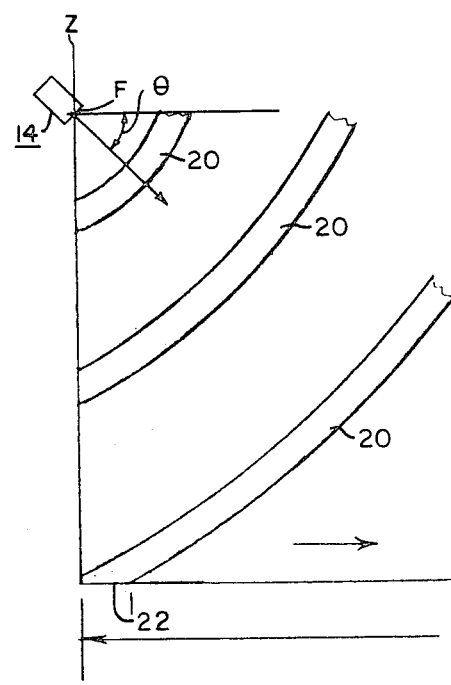
FIG. 4 is a view of the active element of FIG. 3 positioned over the sea bottom, illustrating the projection of acoustic energy.

In FIG. 4 the active element 14 is positioned above a target area such as the sea bottom 17 and the radiating face F is tilted downwardly from horizontal by a depression angle $\theta$ so as to project periodic pulses of acoustic energy toward the sea bottom 17 during the course of travel of the carrying vehicle.

A pulse of acoustic energy 20 provided by the active element 14 travels downwardly toward the sea bottom and at some point in time after transmission, depending upon the speed of sound in the water and the height of the active element 14 above the sea bottom 17, will impinge upon a small area 22. The pulse 20 proceeds onwardly and outwardly to a maximum range $R_M$, dependent upon the speed of sound in the water and the pulse repetition frequency. The Process of impingement of acoustic energy on the target area is herein termed insonification and the area upon which the acoustic energy impinges is herein termed the insonified area. Acoustic energy is reflected in all directions from this insonified area and reflected acoustic energy may be picked up by the side looking sonar receiver transducer carried by the moving vehicle, and a maximum signal will be detected provided that the wave front of the reflected acoustic energy impinges simultaneously over the entire face of the receiver transducer rather than at an angle to it. Basically if the wave front of the reflected acoustic energy does not simultaneously energize the elemental portion making up the elongated receiver transducer, then these elemental portions provide output signals at different points in time, rather than simultaneously, causing a phase shifting along the length of the transducer and a consequent reduction in output signal which output signal is the summation of the outputs of all the elemental areas.

The wave front of reflected acoustic energy is curvilinear relatively close to the point of reflection and is almost linear at a greater distance from the point. Basically straight line transducer arrays are utilized where said greater distances are involved and curved line transducer arrays where relatively shorter distances are involved. By way of example at a certain frequency a straight line array apparatus may be utilized at an altitude above the sea bottom of hundreds of feed and display the sea bottom out to a distance of greater than 1000 feet. A curved line array apparatus may be utilized at an altitude of around 10—20 feet and display the sea bottom out to a distance of a couple of hundred feet.

Figure 5A:
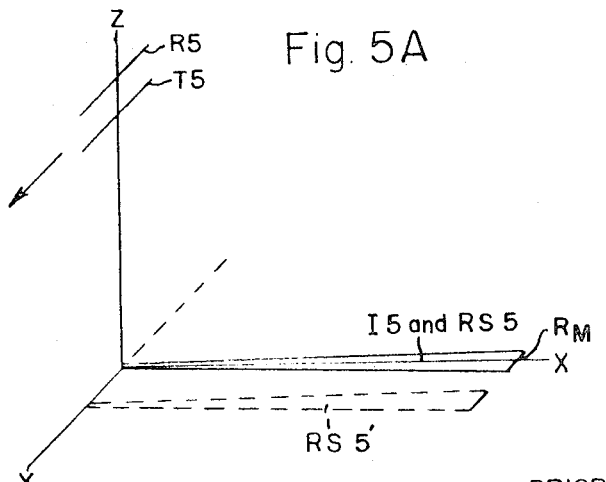
FIG. 5A is a view of a side looking sonar transmitter and receiver positioned relative to an X—Y—Z coordinate system and illustrates an insonified area and a receiver strip on the X—Y plane, in accordance with one prior art system.

In FIG. 5A a transmitter transducer T5 and a receiver transducer R5 are positioned on the Z axis of an orthogonal X—Y—Z coordinate system. For convenience and ease of understanding, the three dimensional elongated transducers are illustrated as one dimensional lines. For a straight line array, T5 and R5 may be thought of as the line 1 in FIG. 3.

It is to be noted that the dimensions illustrated in FIG. 5A, and subsequent figures do not represent actual dimensions but are drawn merely for purpose of illustration.

Figure 5B:
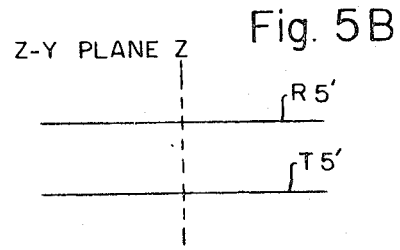
FIG. 5B illustrates a projection of the transducers of FIG. 5A onto the Z—Y plane.
Figure 5C:
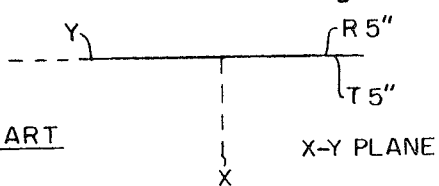
FIG. 5C illustrates a projection of the transducers of FIG. 5A onto the X—Y plane.

The orientation of T5 and R5 with respect to each other and the coordinate system, can best be seen by making reference to FIGS. 5B and 5C. In FIG. 5B, T5′ is the projection of T5 onto the vertical Z—Y plane and is parallel to R5′ which is the projection of R5 onto the Z—Y plane.

In FIG. 5C, looking down on the apparatus, it is seen that T5″, the projection of T5 onto the horizontal X—Y plane is contiguous with R5″, the projection of R5 onto the horizontal X—Y plane.

In FIG. 5A an acoustic transmission from T5 results in an insonified area I5 on the X—Y plane. The insonified area commences from a position directly below the transmitter T5 and extends laterally along The X axis out to a maximum position $R_M$. The insonified area shown in FIG. 5A, as well as subsequent figures, is an idealized showing and is representative of the area where maximum acoustic energy is concentrated.

For the transducer orientation illustrated in FIG. 5A a receiver strip RS5 associated with receiver transducer R5 is contiguous with the insonified area I5. The receiver strip is also idealized and represents an area on the bottom from which the receiver transducer R5 will detect maximum reflected acoustic energy.

With the side looking sonar apparatus traveling at a relatively slow rate in the direction of the arrow, representing a course line and the projection of which forms the Y axis, acoustic energy reflected back from the maximum point RM will be received by receiver transducer R5. However, at a relatively higher speed, the receiver strip will be at a position further along the course of travel, as indicated by the receiver strip RS5′ shown dotted, and consequently the acoustic energy reflected back from the insonified area I5 will not be totally received by the receiver transducer R5 and a proper picture of the sea bottom will not be displayed. A step in the solution of this problem has been to skew the transmitter relative to the receiver, and to this end reference is now made to FIGS. 6A—6C.

Figure 6A:
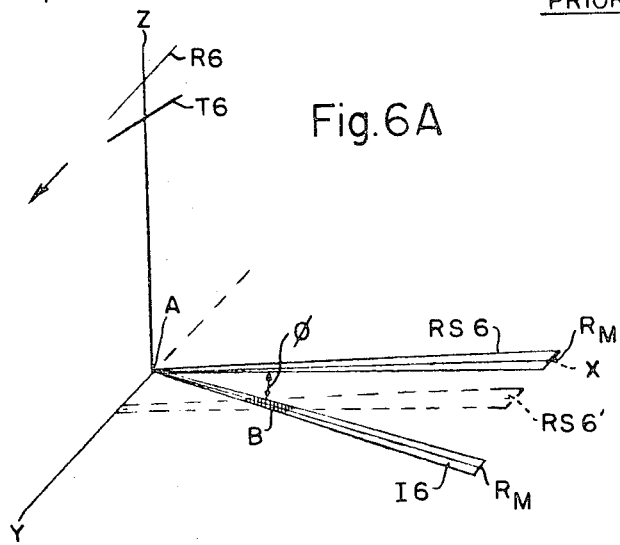
FIGS. 6A—6C correspond to FIGS. 5A—5C and illustrate another arrangement of the prior art.
Figure 6B:
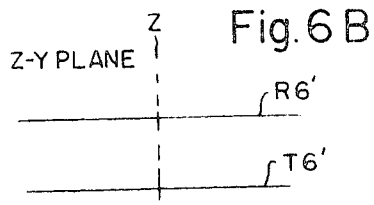
Figure 6C:
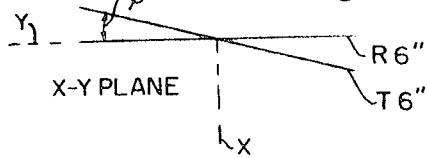

In FIG. 6A the transmitter transducer is designated T6 and the receiver transducer is designated R6. A projection of these two transducers onto the Z—Y plane is illustrated in FIG. 6B and it is seen that the projection T6′ of the Transmitter is parallel to the projection R6′ of the receiver. Looking down upon the apparatus in FIG. 6C representing a projection of the transmitter and receiver onto the X—Y plane it is seen that the projection R6″ of the receiver R6 lies along the Y axis while the projection T6″ of the transmitter T6 is skewed relative thereto at an angle designated $\Phi$.

This orientation produces, as seen in FIG. 6A, an insonified area I6 which is at an angle $\Phi$ with respect to the X axis. For purposes of illustration the angle $\Phi$ has been greatly exaggerated and in actuality $\Phi$ is less than 0.5°.

The receiver transducer R6 has the same orientation as the receiver transducer R5 in FIG. 5A and therefore the receiver strip RS6 extends laterally along the X axis.

With the apparatus proceeding in the direction of the arrow, acoustic energy reflected from area A of the insonified area I6 reaches the receiver transducer R6 when the receiver strip is at the position shown dotted and designated RS6′, at which position it would be receptive to maximum receipt of energy from area B of the insonified area I6. At some point after area B the receiver strip will receive maximum reflected energy from the insonified area I6 due to its angular orientation $\Phi$. The display however will be somewhat degrated in an area close to the line representing the course line of travel of the apparatus.

Figure 7A:
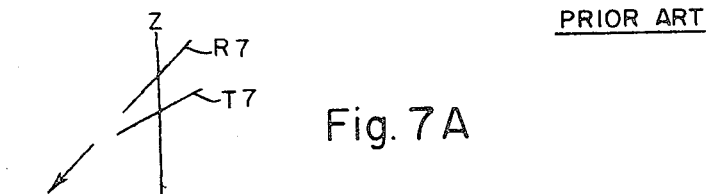
FIGS. 7A—7C are figures similar to FIGS. 5A—5C and illustrate one embodiment of the present invention.

FIG. 7A illustrates a transmitter-receiver orientation which allows for relatively high speeds without sacrificing display picture quality. Basically, the orientation of the transducers are such that the insonified area is projected not only at an angle $\Phi$ with respect to the receiver strip but is projected so that initial acoustic contact on the X—Y plane is at a point further along the Y axis than is the receiver strip.

Figure 7B:
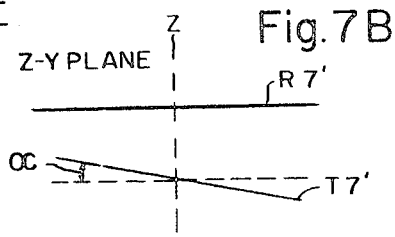

This is accomplished by tilting in a vertical plane, the transmitter with respect to the receiver. In the embodiment illustrated in FIG. 7A the receiver transducer R7 is parallel to the X—Y plane while the transmitter transducer T7 is not only skewed about the Z axis, as previously described, but is also tilted such that an extension of T7 will intersect the X—Y plane. The projection T7′ of the transmitter transducer T7 is illustrated in FIG. 7B and it is seen that T7' is oriented at a predetermined tilt angle $\alpha$ with respect to the projection R7' of the receiver transducer R6 onto the Z—Y plane. R7' is parallel to the X—Y axis and is horizontal.

Figure 7C:
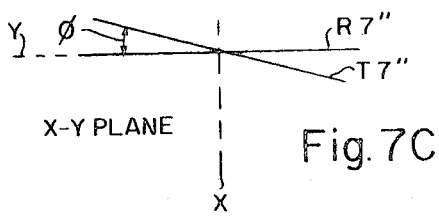

In FIG. 7C the projection T7'' of the transmitter transducer T7 onto the X—Y plane is at an angle $\Phi$ with respect to the Y axis, and the projection R7'' of the receiver transducer R7 onto the X—Y plane lies along the Y axis.

In FIG. 7A the insonified area 17 commences at a point along the Y axis which is displaced a distance $d$ from the X axis, along which lies the receiver strip RS7.

Angle $\Phi$, angle $\alpha$, and the distance $d$, are predetermined in accordance with a desired velocity in the direction of the arrow, at a known altitude above the X—Y plane.

With the arrangement of FIG. 7A an acoustic pulse transmitted by the transmitter transducer T7 on the Z axis, will initially impinge upon the X—Y plane at area A of the insonified area 17 and proceed out to a maximum range $R_M$. With a vehicle velocity in the direction of the arrow, acoustic energy reflected from area A will reach the receiver transducer R7 when it is most receptive to reflected energy within the receiver strip which has proceeded to the position indicated by RS7'. Energy reflected from directly below the apparatus therefor is properly detected. Thereafter, with forward movement of the receiver strip, maximum intensity of energy reflected back from successive portions of the insonified area 17 will be detected.

Figure 8A:
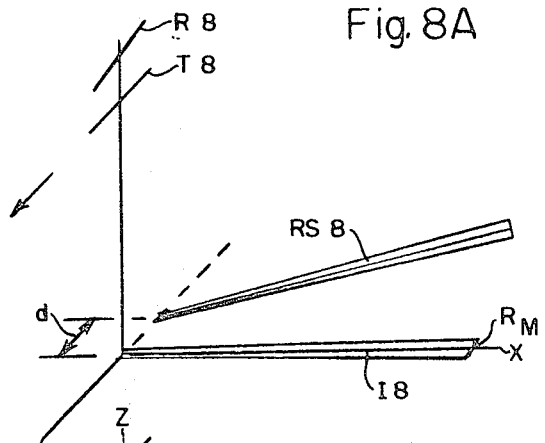
FIGS. 8A—8C are figures similar to FIGS. 5A—5C and illustrate another embodiment of the present invention.
Figure 8B:
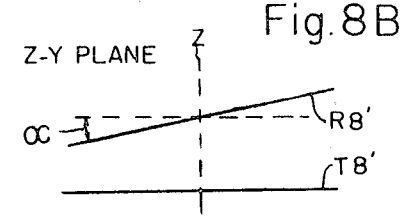

In the modification of FIG. 8A the insonified area 18 is projected laterally along the X axis by means of the horizontally disposed transmitter transducer T8. The receiver transducer R8 is skewed about the Z axis by a certain angle $\Phi$ and is also tilted with respect to the X—Y plane by a certain angle such that its receiving strip RS8 commences at a point on the Y axis displaced a distance $d$ behind the X axis and proceeds outwardly at an angle $\Phi$. The projections of T8 and R8 onto the Z—Y plane is illustrated in FIG. 8B. The projections T8' and R8' are divergent, with T8' being parallel to the X—Y plane and R8' being at an angle $\alpha$ with respect thereto.

Figure 8C:
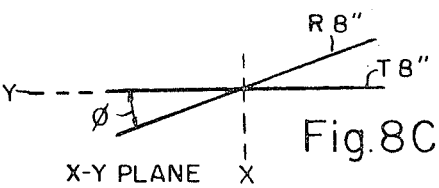

The projection of T8 and R8 onto the X—Y plane is illustrated in FIG. 8C and it is seen that the projection T8'' lies along the Y axis while the projection R8'' is at an angle $\Phi$ with respect thereto.

With a velocity in the direction of the arrow, the receiver strip RS8 will have moved a distance $d$ to overlap the beginning of the insonified area 18 so that the receiver transducer R8 receives reflected acoustic energy at maximum intensity, due to minimum phase shifting along the transducers face. Thereafter the receiver strip RS8 will progressively sweep the insonified area 18 to the maximum point $R_M$ thereby receiving at maximum intensity reflected acoustic energy from the entire insonified area.

Figure 9A:
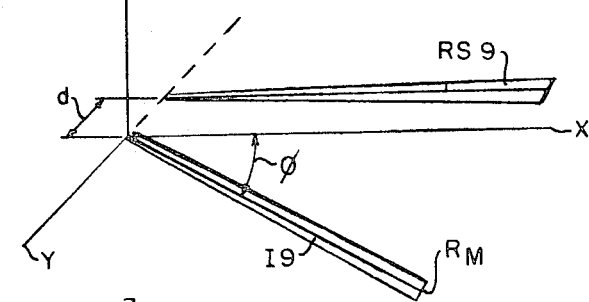
FIGS. 9A—9C are figures similar to FIGS. 5A—5C and illustrate another embodiment of the present invention.

FIG. 9A illustrates another transducer-receiver orientation for accomplishing the same purpose. The transmitter transducer T9 is skewed about the Z axis and is parallel to the X—Y plane, and the receiver transducer R9 is tilted at an angle with respect to the X—Y plane.

Figure 9B:
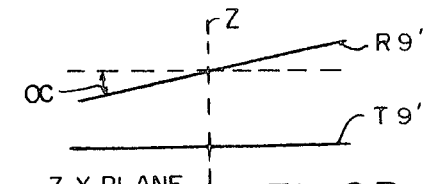

FIG. 9B shows the projections T9' and R9' of the transmitter and receiver transducers onto the Z—Y plane. T9' and R9' are divergent with respect to one another with R9' being at an angle $\alpha$ with respect to the horizontal, that is, the X—Y plane.

Figure 9C:
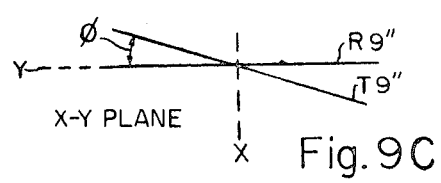

In FIG. 9C the projection onto the X—Y plane shows the transmitter projection T9'' at an angle $\Phi$ with respect to the receiver projection R9'' which lies along the Y axis.

In FIG. 9A the insonified area 19 proceeds from the intersection of the Z axis with the X—Y plane, outwardly at an angle $\Phi$. The receiver strip RS9 is parallel to the X axis and is displaced at a distance $d$ behind it to intercept the acoustic energy reflected from the entire insonified ares 19 as the apparatus travels in the direction indicated by the arrow.

FIGS. 7A, 8A and 9A illustrate transmitter-receiver orientations which provide an insonified area angularly disposed with respect to a receiver strip and displaced at a distance $d$ therefrom along the Y axis whereby at increased vessel speeds acoustic energy reflected from substantially all of the insonified area may be properly detected at substantially maximum intensity. For operation at even faster speeds the embodiment shown by way of example in FIG. 10A may be utilized.

Figure 10A:
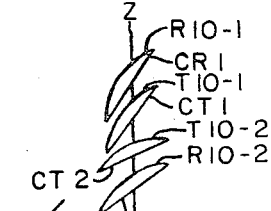
FIG. 10A illustrates an X—Y—Z coordinate orientation of an embodiment of the invention wherein curved transducers are utilized.

Basically, a plurality of transmitters are utilized at respective different frequencies to insonify adjacent areas on the sea bottom. For each transmitter there is a respective receiver responsive to that transimitter's frequency for detecting acoustic energy reflected from the insonified areas. FIG. 10A illustrates four transducers situated on the Z axis, each transducer being curved as in FIG. 3B with the middle two transducers being the transmitters and designated T10–1 and T10–2, and the top and bottom transducers being the receivers and designated R10–1 and R10–2.

The transducers of FIG. 10A are curved lines extending between respective pairs of spaced-apart points. The line which joins the spaced-apart points for each transducer forms a chord for that arcuate transducer. The chords have been designated CR1 (C for chord, R1 for receiver 1) CT1 (C for chord, T1 for transmitter 1), CT2 (C for chord, T2 for transmitter 2) and CR2 (C for chord, R2 for receiver 2). The two transmitters transducers T10–1 and T10–2 are skewed about the Z axis and all four of the transducers, more particularly their chords are at an angle with respect to the X-Y plane.

Figure 10B:
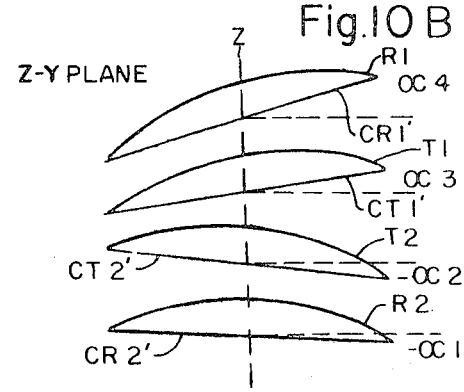
FIG. 10B is a projection of the transducers of FIG. 10A onto the Z—Y plane.
Figure 10C:
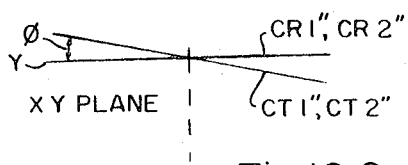
FIG. 10C is a projection of the chords of FIG. 10A onto the X—Y plane.

FIG. 10B illustrating a projection onto the Z-Y plane shows the projection CR 2' of chord CR2 at an angle $-\alpha_1$ with respect to horizontal (the X—Y plane); the projection CT2' of chord CT2 at an angle of $-\alpha_2$ with respect to horizontal; the projection Ct1' of chord CT' at an angle of $\alpha_3$ with respect to the horizontal; and the projection Cr1 of chord CR1 at an angle of $\alpha_4$ with respect to horizontal. The projections onto the X—Y plane are seen in FIG. 10C. The two transmitters are skewed by the same angle and their chord projections CT1'' and CT2'' are contiguous with one another and are at an angle $\Phi$ with respect to the Y axis. The projections of the receiver chords CR1'' and CR2'' are perpendicular to the X axis.

With a chord oriented at a negative $\alpha$ angle its respective insonified area or receiver strip (more particularly the centerline of such area or strip) intersects the Y axis at a point ahead of the X axis in the direction of travel. For positive $\alpha$ angles the intersection with the Y axis occurs behind the X axis with respect to the direction of travel.

Transmitter transducer T10–1 operating at a frequency of $F_1$ produces the insonified area I10–1. Transmitter transducer T10–2 operating at a frequency $F_2$ provides the insonified area I10–2 generally separated from I10–1 by a distance $d_2$. Associated with receiver transducer R10–1, responsive to frequency $F_1$, is receiving strip RS10–1, and associated with receiver transducer R10–2, responsive to frequency $F_2$, is receiving strip RS10–2.

Along the Y axis each receiver strip is separated by a distance $d_1$ from its respective insonified area. The angular orientations and separations illustrated in FIG. 10A have been shown for purposes of illustration. In actuality the insonified area is oriented at an angle $\Phi$ of less than 1° with respect to a receiving strip and the insonified areas I10–2 may be actually just touching one another or even overlapping one another to a certain degree. The distances $d_1$ as previously discussed, are a function of vessel speed and altitude above the sea bottom. The apparatus of FIG. 10A wherein a plurality of insonified areas are simultaneously projected allows for greatly increased vessel speeds without loss of resolution since for one transmission (of $F_1$ and $F_2$) a wider area of sea bottom may be examined. An actual construction embodiment of the arrangement of FIG. 10A is illustrated in FIG. 11 to which reference is now made.

Figure 11:
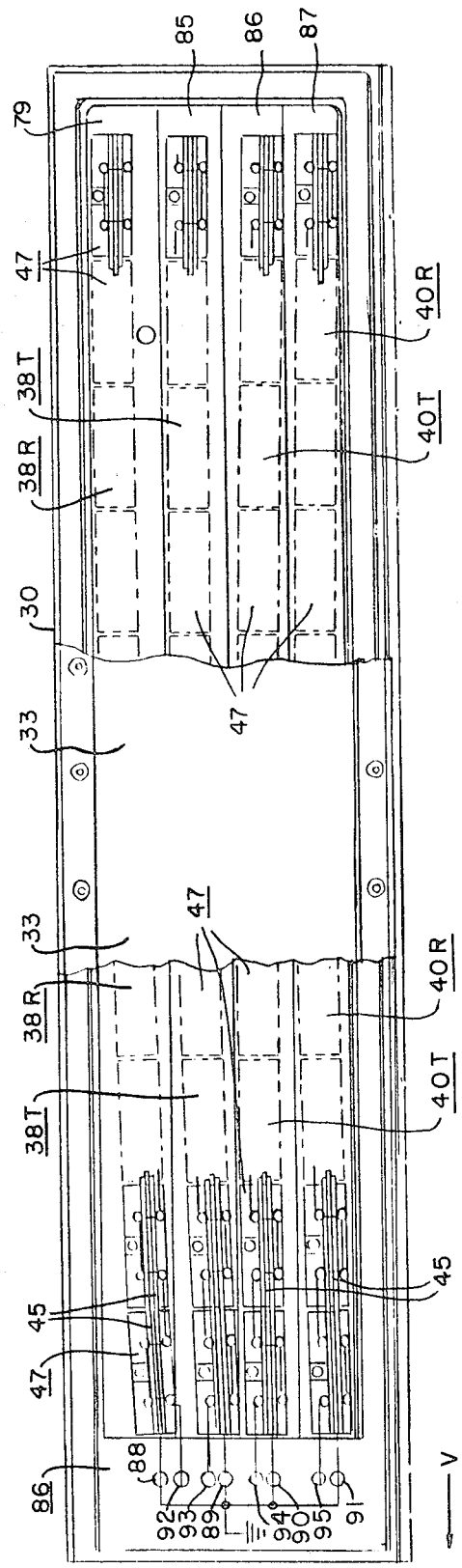
FIG. 11 illustrates a physical manifestation of the embodiment of FIG. 10A.

The transducers are contained within a housing 30 having a covering member 33 secured to the housing 30 over its entire length but which is broken away in FIG. 11 to permit a view of the interior. The covering member 33 has acoustic transmission properties similar to the fluid medium in which the transducer operates. For a sea water environment the covering member 33 may be of a material known as rho–C rubber.

Figure 13:
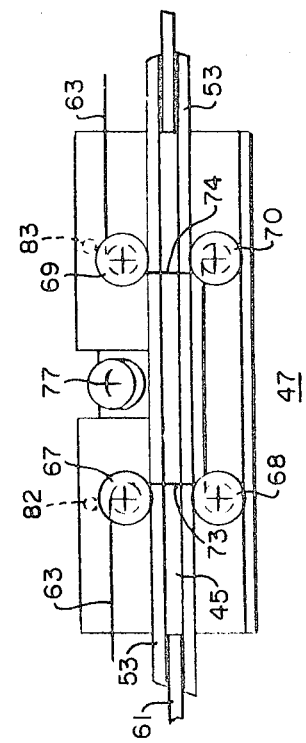
FIG. 13 is a view along line AA of FIG. 12.
Figure 12:
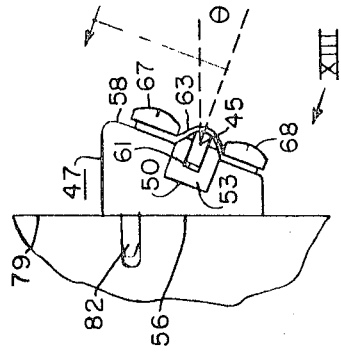
FIG. 12 illustrates an end view of a constructional block utilized in the fabrication of the apparatus of FIG. 11.

The housing 30 contains four transducer means, two for transmitting and two for receiving. First transmitter transducer means 38T corresponds to T10–1 in FIG. 10A and first receiver transducer means 38R corresponds to R10–1. Second transmitter and receiver transducer means 40T and 40R correspond respectively to T10–2 and R10–2. Each curved transducer includes an active element made up of a plurality of short segments 45 of a transducer material such as barium titanate. For constructional purposes, each short segment 45 is contained within an individual block of material 47, plastic being one suitable material, with the blocks being positioned in end to end fashion in the desired curvilinear orientation. For a more detailed view of a typical block, reference should additionally by made to FIG. 12 showing an end view of such block, and FIG. 13 showing it in plan view.

The block contains a groove 50 into which is inserted the short segment of active material 45 and a suitable backing member 53 such as a sound absorbing rubber or Corprene, a mixture of cork and neoprene rubber.

The block 47 includes a base surface 56 which is vertical during operation, and a front surface 58 which is downwardly inclined during operation. The groove 50 is machined or molded into the block 47 at a certain angle wit respect to vertical such that the short segment of active material 45 assumes a downward angle $\theta$ previously described, in FIG. 4, as the depression angle.

In order to have proper transducer action for transmitting and receiving, there is provided electrical connection to the active element. This is accomplished by the provision of a continuous electrode 61 which takes the form of a metallic ribbon situated within a groove in the backing member 53 and which contacts the rear surface of each short segment of active material. Electrode means are additionally provided for the front, or active radiating face and takes the from of a continuous wire 63 constituting a second electrode.

Each individual block 47 carries four projections or fastening means shown as screws designated 67 and 70, and the wire electrode 63 is looped around these screws and makes electrical contact with the active face as indicated at 73 and 74.

Fastening means such as screw 77 secured the block 47 to a wall 79 of the housing 30. In order to properly orient the block 47 there is provided cooperative engagement positioning means such as posts 82 and 83 which mate with holes in the wall 79, predrilled to provide the desired curvilinear orientation.

Transducer 38R is mounted on the wall 79, 38T is mounted on wall 85; 40T is mounted on wall 86; and 40R is mounted on wall 87. Walls 85 and 86 carrying the transmitters are skewed so that the right-hand portion of walls 85 and 86 are closer to the viewer than the left-hand portion of those walls. Walls 85 and 86 are at a relative angle $\Phi$ wit respect to walls 79 and 87, the angle $\Phi$ being equivalent the angle $\Phi$ illustrated in FIG. 10C.

Each of the transducers on a respective wall is tilted so that in FIG. 11 a line joining the end points of the active element forms a cord at a respective angle of $-\alpha_1$ for transducer 40R, $-\alpha_2$ for transducer 40T, $\alpha_3$ for transducer 38T and $\alpha_4$ for transducer 38R, the $\alpha$ designations being identical to those described with respect to FIG. 10B.

An electronics section 86 is included for the apparatus and the first electrode 61 of all of the transducers are electrically connected to respective terminal means 88 to 91 collectively, and electrically connected to ground. The second electrode 63 of each transducer is connected to a respective terminal means 92 to 95, as is well known to those skilled in the art.

There has been described herein side looking sonar apparatus which permits examination of a target area at speeds faster than heretofore. It is understood that the present disclosure has been made by way of example and that modifications and variations of the present invention are made possible in the light of the above teachings.

What I claim is:

1. Side looking sonar apparatus, comprising:
    first transducer means including a first elongated transducer active element extending between a first pair of spaced points;
    second transducer means including a second elongated transducer active element extending between a second pair of spaced points;
    the projection of a straight line joining said first pair of spaced points onto a vertical Z—Y plane being divergent at an angle $\alpha$ with respect to the projection of a straight line joining said second pair of spaced points onto said Z—Y plane;
    the projection of-said line joining said first pair of spaced points, onto a horizontal X—Y plane being divergent at an angle $\Phi$ with respect to the projection of said line joining said second pair of spaced points, onto said X—Y plane;
    said angles $\alpha$ and $\Phi$ being relatively small and substantially less than 90°;
    one of said transducer means being for narrow beam projection of acoustic energy toward a target area;
    the other of said transducer means being for narrow beam reception of said acoustic energy reflected back from said target area.

2. Side looking sonar apparatus for travel along a course line over a target area comprising:
    a. first transducer means including a first elongated transducer active element for propagation of acoustic energy onto said target area, the impingement of said acoustic energy producing a relatively narrow insonified area;
    b. second transducer means including a second elongated transducer active element for reception of acoustic energy reflected from a relatively narrow receiver strip on said target area;
    c. said first and second transducer means being oriented relative to one another that
        i. said insonified area is at an angle $\Phi$, greater than zero degrees and substantially less than 90°, with respect to said receiver strip,
        ii. said insonified area is displaced from said receiver strip, by a distance $d$, along a projection of said course line onto said target area,
        iii. said receiver strip sweeps substantially all of said insonified area during the course of said travel over said target area.

3. Side looking sonar apparatus comprising:
    a. an elongated transducer transmitter;
    b. an elongated transducer receiver;
    c. said transmitter being skewed relative to said receiver by an angle $\Phi$;
    d. said transmitter additionally being tilted relative to said receiver by an angle $\alpha$;
    e. said angles $\alpha$ and $\Phi$ being relatively small and substantially less than 90°.

4. Side looking sonar apparatus comprising:
    a. a housing member having at least a wall surface;
    b. a plurality of blocks each including a rear surface, a front surface angularly disposed relative to said rear surface, said front surface including a groove;
    c. acoustic backing material disposed in each said groove and containing a short segment of transducer active element having a rear surface and an active face;
    d. electrode means forming electrical connection with said short segments of transducer active elements;
    e. cooperative engagement positioning means on said rear surface for positioning said blocks along said wall surface in end to end configuration forming an elongated transducer means.

5. Apparatus according to claim 4 wherein the electrode means includes:
    a. a first electrode contacting the rear surface of each short segment of transducer active element; and b. a second electrode in the form of a continuous wire looped over the active face of each short segment of transducer active element to make electrical contact therewith at at least two points.

6. Side looking sonar apparatus for travel over along a course line over a target area comprising:
 a. first transducer means operable at a first frequency for propagation of acoustic energy onto said target area, the impingement of said acoustic energy producing a relatively narrow first insonified area;
 b. second transducer means operable at a second frequency for propagation of acoustic energy onto said target area, the impingement of said acoustic energy producing a relatively narrow second insonified area;
 c. third transducer means responsive to said first frequency for reception of acoustic energy reflected from a relatively narrow first receiver strip on said target area;
 d. fourth transducer means responsive to said frequency for reception of acoustic energy reflected from a relatively narrow second receiver strip on said target area;
 e. said first, second, third and fourth transducer means being oriented relative to one another that
  i. said first and second insonified areas are adjacent and at angles greater than 0° with respect to said first and second receiver strips and
  ii. said first and second insonified areas are displaced from said first and second receiver strips, respectively, by respective predetermined distances, along a projection of said course line onto said target area.